Nov. 7, 1967  JAMES E. WEBB  3,350,926
ADMINISTRATOR OF THE NATIONAL AERONAUTICS
AND SPACE ADMINISTRATION
MINIATURE STRESS TRANSDUCER
Filed Oct. 29, 1964
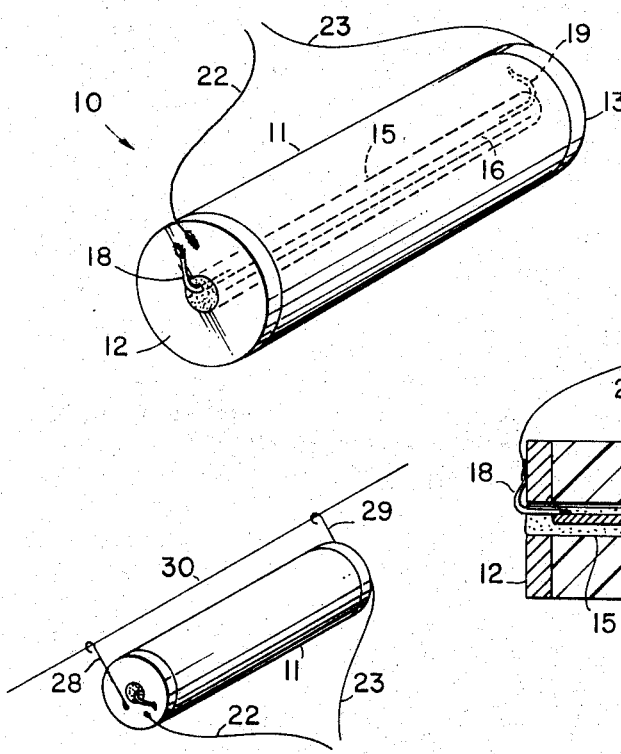
FIG. 1
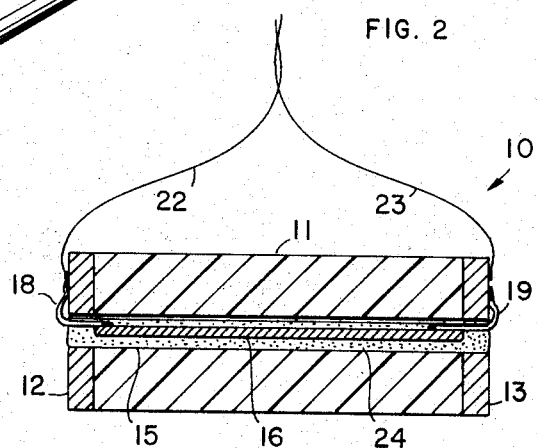
FIG. 2
FIG. 3
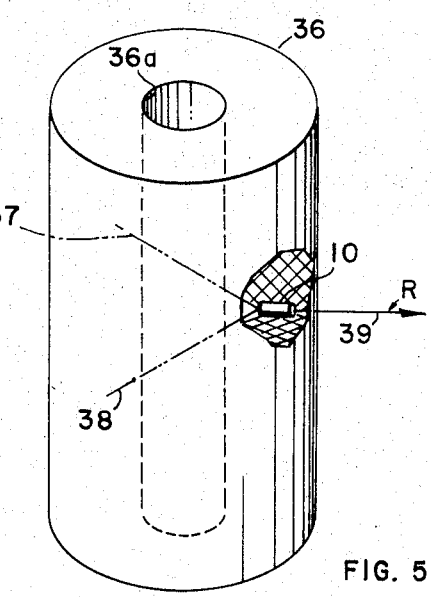
FIG. 5
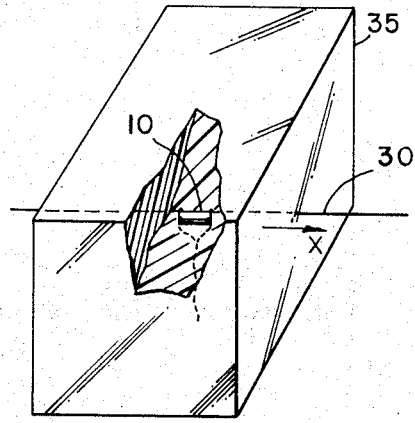
FIG. 4
INVENTORS
ANTHONY SAN MIGUEL
ROBERT H. SILVER
BY
*J. McCoy*
ATTORNEY 3,350,926
Patented Nov. 7, 1967

3,350,926
MINIATURE STRESS TRANSDUCER
James E. Webb, Administrator of the National Aeronautics and Space Administration with respect to an invention of Anthony San Miguel, Canoga Park, and Robert H. Silver, Los Angeles, Calif.
Filed Oct. 29, 1964, Ser. No. 407,599
4 Claims. (Cl. 73—88.5)

The invention described herein was made in the performance of work under a NASA contract and is subject to the provisions of Section 305 of the National Aeronautics and Space Act of 1958, Public Law 85-568 (72 Stat. 435; 42 U.S.C. 2457).

The present invention relates to sensing devices and, more particularly, to an improved stress transducer.

Devices have been developed to sense various phenomena occurring in matter subjected to different physical forces. Strain transducers, for example, are extensively used to sense dimensional changes of materials subjected to strain, whether in compression, tension, or shear. Such transducers usually comprise of a basic sensing element, which in response to a change in its dimension, produces a related change in a particular characteristic of it. The strain transducer is generally mounted on the surface of the material subjected to the strain, so that the dimensions of the sensing element change in relation to the change in dimension of the strained material. The dimensional changes of the element produce a related change in the particular characteristic which may be detected or recorded, thereby providing a measure of the strain to which the actual material has been subjected.

Similarly, stress transducers include a sensing element which detects stress forces applied to a material to which the stress transducer is coupled. But, unlike the sensing element in a strain transducer, the sensing element in a true stress transducer does not provide signals related to a change in its dimensions. Rather, its particular characteristic changes due to a change in the stress applied thereto. However, despite these distinctive characteristics of the sensing elements to be used in strain and stress transducers, quite often, sensing elements which are particularly useful in one type of transducer are employed in another type.

In recent years, techniques have been perfected to develop or grow semiconductive crystalline materials which possess piezoresistive property. Silicon and germanium are two of the better known crystals having such piezoresistive properties. Basically, a piezoresistive element is one which produces a change in resistivity as a function of change in the stress applied thereto. Material equations, which define or describe the physical properties of such crystals, have been developed, and are elaborately described in the literature of the art. The essence of the equations clearly indicate that the change in resistivity of a semiconductive piezoresistive crystal is due to the change in stresses that the crystal is subjected to, rather than any strains experienced thereby. Namely, $\Delta \rho = f(\pi_{ij}, \tau_{ij})$ where $\Delta \rho$ represents a change in resistivity, $\pi_{ij}$ represent piezoresistive coefficients unique to the particular crystal, and the $\tau_{ij}$ represent components of a general stress tensor. The relationship clearly indicates that a change in stress rather than strain produces a relative change in resistivity. Yet, despite such clear resistivity-stress relationship, some semiconductive piezoresistive elements are employed as the sensing elements in strain transducers. It should be recognized that the stress-strain relationship of semiconductors, in general, is anisotropic. Hence, the usual physical constants, such as Young's modulus, cannot be used to explain the operation of semiconductive materials when used as strain sensing elements.

The limited operability or use of such strain transducers can only be explained when considering all the physical phenomena occurring in a semiconductive piezoresistive element subjected to stress. Whenever such an element is subjected to stress forces, which often include shear stress, and the element is relatively unrestricted, due to the anisotropic relationship between stress and strain of the element, the shear stress will cause an inconsequential strain in the element. Thus, the applied stress does not only change the resistivity of the element but, in addition, also changes the dimensions thereof. It is this change in dimension, due to shear stress, that is detected in the strain transducers which employ such semiconductive piezoresistive elements as their sensing element.

However, the relative dimensional changes of such elements is quite small before the elements actually break, therefore, greatly limiting their use as strain sensing elements. Even theoretical strain values limit the dimensional changes of such crystals 0.006 of an inch per inch of length, however, 0.001 of an inch per inch of length seems to be more a practical strain limiting value. Although these magnitudes may be used in the elastic realm of rigid materials such as steel, these values negate the usage of such elements to measure the finite strains exhibited by, say, plastics. Irrespective however of their change in dimension, the change in resistivity is a result of the stress applied to the elements and not the change in their dimensions.

Most stress transducers, like the presently known strain transducers, are generally coupled to the surface of the material subjected to the stress forces. Thus, most of the accurate data obtained is for surface stress conditions. The stress distribution within the material is only theoretically derived on the basis of the external loading and the particular physical properties of the material in question, which in themselves are based on theory and simple stress-strain experiments. Yet, a prerequisite for material property or stress analysis investigation is a knowledge of multiaxial stress distribution within the material being subected to environmental restraints. Despite such requirements, however, little effort has been directed toward measuring the principal stresses existing in a point region within a material. This is mostly due to the unavailability of a reliable true stress sensitive element which may be used in a very small transducer embedded within a material, the internal stress distribution of which is to be analyzed.

Prior art stress transducers are too large to be embedded within a material to detect directional stress forces at a point region therein. In addition, stress sensing elements known in the prior art have isotropic characteristics, namely, they sense stress applied from any direction. Yet for multiaxial stress analysis, data is desired for stress conditions present only along particular well defined directions. Thus, presently known stress sensing elements are substantially useless in such multiaxial stress studies.

Accordingly, it is an object of the present invention to provide an improved direction-sensitive stress transducer.

Another object of the present invention is the provision of an improved highly reliable, relatively rigid miniature direction-sensitive stress transducer.

Yet another object of the present invention is to provide an improved relatively rigid miniature direction-sensitive stress transducer which employs a bonded semiconductive piezoresistive element embedded within the transducer so as to minimize any strain effects thereon.

Still another object of the present invention is the provision of a relatively rigid miniature solid-state direction-sensitive stress transducer in which a semiconductive piezoresistive element is completely embedded in a rigid transducer housing thereby minimizing any strain effects thereon, the change in resistivity of the element being due only to stress forces impressed thereon along a particular stress-sensitive axis of the element.

A further object of the present invention is the provision of a miniature highly accurate relatively rigid direction-sensitive stress transducer which may be embedded in a material so as to actually sense internal stresses along selected directions at a selected point region therein.

These and other objects of the invention are achieved by providing a transducer in which a very small piezoresistive crystal, or filament, of a semiconductive material such as silicon, is used as the sensing element. Due to the particular properties of silicon, it may be grown in a selected crystallographic orientation to possess piezoresistive characteristics along a selected axis. Namely, the element is grown or developed so that only if stress is applied along the particular axis thereof, a change in resistivity occurs. The element, though being of extremely small size, is highly sensitive, so that a detectable change in resistivity occurs for a wide range of stress changes.

The element, which due to its small size is quite fragile, is protected in a rigid miniature housing which is made of a suitable moldable or machinable material such as inadetched Teflon. The housing, in addition to protecting the fragile element, also limits the dimensional changes thereof, thereby greatly increasing the range of stress forces which may be applied to the element without it being subjected to dimensional changes greater than the element can reasonably withstand without breaking. Output leads, which are connected to the element, serve as means of connecting the transducer to the rest of the instruments used to measure and record the change in resistivity of the sensing element and thereby record the stress force.

The entire transducer, including the miniature rigid housing in which the element is embedded, is extremely small so that it may be conveniently embedded within a material subject to environment imposed stress forces to be analyzed. The piezoresistive sensitive axis of the element within the transducer is aligned with the expected stress axis so that the stress along a particular direction within the material may be sensed. Since the transducer is very small, the region wherein it is embedded may be thought of as a point region. A plurality of transducers may be mounted about such a point, each transducer being aligned with a different axis (stress rosette) along which stress data is desired, so that data for a multiaxial stress analysis of the point region may be obtained.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is an isometric view of the miniature stress transducer of the present invention;

FIGURE 2 is a sectional view across the stress transducer of the present invention;

FIGURE 3 is a mounting arrangement for the stress transducer of the present invention;

FIGURE 4 is an isometric view of one example of an application of the transducer of the present invention; and FIGURE 5 is an isometric view of another application of the miniature stress transducer of the present invention.

Reference is now made to FIGURE 1 which is an isometric view of the stress transducer of the present invention. As seen therein, a transducer 10 comprises a rigid housing 11, shown shaped as a cylinder, with disc-like metallic end plates 12 and 13 being coupled to the ends thereof. The housing 11 and the end plates 12 and 13 have a common opening 15 which is aligned with their lonigtudinal axes. A semiconductive piezoresistive element 16 is mounted within the opening 15 of the housing 11. The element 16 is chosen to have piezoresistive characteristics along a particular axis. For example, a P type silicon having a [111] crystallographic orientation may be chosen as the sensing element for a normal stress component. Two end leads 18 and 19 which are connected to the sensing element 16 are welded to end plates 12 and 13 respectively. Output leads 22 and 23 are also connected to the end plates 12 and 13, thereby providing means for connecting the transducer of the present invention to other instruments used to measure the resistance of element 16, as well as any change thereof which is produced as a function of stress applied thereto.

Reference is now made to FIGURE 2 which is a sectional view of the transducer of the present invention. As seen therein, the sensing element 16 is rigidly mounted to the housing 11 by means of any suitable bonding material such as cured epoxy 24, which is poured or injected into the opening 15 after the element 16 is properly positioned therein. The epoxy 24 may similarly be used to bond or couple the housing 11 to the end plates 12 and 13. As previously explained, by rigidly supporting the sensing element 16 within the housing 11, the element which is extremely small, is protected from being inadvertently damaged or broken. In addition, by being enclosed in the rigid housing 11, the element 16 may be subjected to stress forces greater than could have been realized had the element been free to change the dimensional characteristics thereof. Namely, by minimizing the dimensional changes of the element 16, greater stress forces may be applied thereto without subjecting the element to dimensional changes beyond those which the element may practically tolerate without rupturing or breaking.

The relative dimensions of the parts comprising the novel transducer of the present invention shown in FIGURES 1 and 2 are presented for explanatory purposes only. In actual reduction to practice, the transducer is very small, the overall dimensions not exceeding 0.080 of an inch, or 80 mils in length and 45 mils in diameter. The thickness of each of the end plates 12 and 13 may be held to not more than 5 mils with the opening 15 not exceeding 0.007 inch in diameter. The element 16 may comprise a semiconductive silicon piezoresistive element which is bar-like in shape, and small enough to be insertable into the housing 11 through the 0.007 inch diameter opening 15. The element includes two lead wires of approximately 2 mils in diameter which may be electronically spot-welded to the end plates 12 and 13. Output leads not exceeding 2 mils in diameter may also be welded to the end plates, thereby providing resistive continuity between the element 16 and circuitry used to measure or monitor any changes thereof.

As previously stated, the sensing element incorporated in the transducer of the present invention exhibits a change in resistivity only along a particular axis along which the element is stress-sensitive. For example, assuming that the longitudinal axis of the element 16 is its stress-sensitive axis, it is seen from FIGURES 1 and 2 that only external stresses applied parallel to the longitudinal axis of the housing 11 will be detected by a change in the resistance of the element 16. Thus, the stress transducer 10 of the invention may be thought of as a unidirectional stress transducer, since only stress applied in a particular direction is detected. Such a property is particularly important for stress analysis where stress components along particular axes are to be determined.

In addition to possessing unidirectional detectional properties, the transducer of the present invention is very small. Consequently, the transducer is particularly adaptable to be embedded in a material under stress which is to be analyzed. For example, if the material to be analyzed is moldable, the transducer may be positioned in the mold prior to forming the material, so that once the material is molded and hardened, the transducer is embedded therein at a selected point. The positioned transducer is aligned with its stress-sensitive axes parallel to the directional of stress to be detected. Since the stress-sensitive element is so small, the stress detected thereby may be thought of as being applied or present at a point region within the material. Multiaxes stress analysis or data of the point region may be obtained by embedding a plurality of transducers about the same point, each transducer being aligned with a different stress axes or direction of interest. Thus, the data from each transducer represents stress along its particular axes, the composite data of the entire assembly providing the desired multi-axes stress data or information.

Since the transducer is very small, special means need be provided for positioning the transducer so that it be properly embedded at a particular point in the material to be tested. Referring to FIGURE 3 which is an isometric view of a mounting arrangement for the stress transducer of the present invention, there are shown a pair of hook-like mounting leads 28 and 29 welded to the end plates 12 and 13 respectively. Each of the leads 28 and 29 is provided with a hook or loop-like arrangement so that a support wire 30 may be strung therethrough. The ends of the wire 30 may be connected to the mold for forming the material to be tested. Thus, the exact position of the transducer within the material to be molded may be selected by properly fastening the wire 30 to the mold prior to the molding of the material.

Reference is now made to FIGURES 4 and 5 which are isometric views of arrangements wherein the novel transducer of the invention is shown embedded in materials so that it may detect internal stresses at particular points thereof. As seen in FIGURE 4, the transducer 10 is embedded in a cube-shaped block 35 which, for explanatory purposes, is assumed to be transparent. The transducer was positioned in the mold which formed the block 35 by means of a wire 30 so that once the material hardened, the transducer is at the desired point region therein. As shown in FIGURE 4, the transducer is oriented to sense stress in an X axis only with which the stress-sensitive axis of the element within the transducer 10 is aligned. If the block 35 is subjected to stress in directions other than the X axis, the transducer may detect some stress changes. However, these changes are not due to the detection by the transducer of stress in directions other than the X axis. Rather, they are due to the stress changes in the material in the X axis which is a result of the coupling stress due to the stress applied to the material in other directions thereof.

The housing 11 of the transducer 10 which is embedded in the block 35 is made of material strong and rigid enough to withstand the maximum expected stress to be measured. In addition, the material comprising the housing 11 is selected to have good bonding properties to the material of the block 35, so that proper coupling between the two is easily accomplished.

Different methods may be used to suspend the transducer within the mold, so that when the molded material hardens, the transducer is embedded at a particular point region therein. For example, in FIGURE 5, the transducer 10 is shown suspended within a mold 36 by means of three wires 37, 38, and 39. The wires are attached to the transducer and the walls of the cylindrically-shaped mold 36 so that the transducer is aligned with a particular axis thereof. Such a mold, having an internal bore 36a may be used to mold a solid propellant motor, wherein stress forces from the internal bore are applied to solid matter propellant. By so embedding the transducer, the stress from the internal bore along a radial direction R at the point region where the transducer is embedded may be detected.

In the foregoing description, the wires used to position the transducer within the molds may be properly lubricated. After the material in which the transducer is embedded hardens, the wires may be pulled out, leaving only the positioned transducer with its output leads within the material. It is apparent that the transducer may be embedded in materials which are moldable at temperatures below the critical temperature at which permanent damage is done to the transducer. For example the transducer may be conveniently embedded in moldable plastic and resins. However due to the extremely small size of the transducer, it is possible to embed it even in metals which are generally molded at very high temperatures. This may be accomplished by drilling a very small hole in the metal, the hole being sufficiently large for the transducer to be placed therein. Thereafter, a bonding agent such as epoxy may be used to properly couple the transducer to the metal so that stress applied to the metal is sensed by the sensing element of the transducer.

In one actual reduction to practice, a transducer was constructed comprising of a cylindrically-shaped housing 11 made of Teflon, 0.080 inch long and approximately 0.046 inch in diameter. The opening 15 was drilled through the Teflon housing, along its longitudinal axis with a 0.007 inch diameter drill. Two end plates punched out of 0.005 inch thick stainless steel sheet stock through which 0.007 inch diameter holes were drilled out, were used as the end plates 12 and 13. Two mil wire loops and lead wires were then resistance-welded to the end plates. The Teflon housing and the two end plates with the wires welded thereon were then placed in an ultrasonic cleaner for 30 seconds. Thereafter, they were removed and rinsed in a clean acetone, and oven-dried. The Teflon cylinder was next immersed in a Teflon echant, so as to provide an external surface suitable for bonding the Teflon housing to the material in which the transducer was eventually to be embedded.

An epoxy adhesive was then used to bond the end plates to the ends of Teflon cylindrical housing. The entire assembly was then oven-cured for two hours at 200° F. A P type silicon sensing element having a [111] crystallographic orientation was then carefully threaded through the opening of the cylindrical Teflon housing with the two end plates mounted thereon. Gold lead wires which were connected to the ends of the silicon sensing element were then resistance-welded to each of the end plates. A small amount of catalyzed epoxy was then dipped into the space between the sensing element and the cavity in the opening of the cylindrical housing in order to properly bond by adhesion the sensing element to the Teflon itself. The entire assembly was again oven-cured for two hours at 200° F. After curing, this transducer was dipped into a catalyzed epoxy and cured according to the previous schedule while rotating slowly about its longitudinal axis, thus completing the entire series of manufacturing steps necessary to produce the novel miniature stress transducer according to the teachings disclosed herein.

The novel transducer of the present invention was used in various material stress analyses, and was found to provide accurate and reproducible data at a high degree of stress sensitivity, the stress analyses being conducted in both compression and tension stress environments. In other actually reduced to practice stress analysis applications, a plurality of transducers of the present invention were arranged about point regions in moldable material, so as to detect stress along the particular axis with which the various transducers were aligned, thereby providing multiaxial stress data for the point.

There has thus been described a novel and useful miniature stress transducer employing a semiconductive piezoresistive sensing element which produces a change in resistivity as a function of changes in stress along a particular stress sensitive axis thereof. The miniature sensing element is embedded and bonded within a rigid housing. The housing is preferably made of materials such as fluorocarbon resins, polyethylene and similar materials which can be conveniently molded and machined. The end plates which are connected to the housing serve to interconnect the sensing element through output leads to external measuring circuitry which records the changes in resistance of the sensing element, and thereby provides a record of the stress to which the sensing element of the transducer is subjected. The rigid housing, besides supporting and protecting the fragile miniature sensing element, greatly increases the range of stress to which the sensing element may be subjected by limiting the dimensional changes thereof. Thus, the change in resistivity of the sensing element is directly attributable to change in the stress applied thereto.

It is apparent to those familiar with the art, that modifications may be made in the arrangements as shown, as well as in the particular dimensions of the components hereinbefore described, without departing from the true spirit of the invention. Therefore, all such modifications or equivalents are deemed to fall within the scope of the invention as claimed in the appended claims.

What is claimed is:

1. The method of determining the change in stress in a particular direction in a block of matter which is adapted to undergo a known change in dimension in said direction in the stress range to be determined the steps comprising:

embedding an element having piezoresistive characteristics along a sensitive axis in a protective rigid housing which is adapted to undergo a smaller change in dimension than said block of matter in the stress range to be determined to protect the element therein;

connecting a pair of output leads to ends of the said element through which to sense change in resistivity of the element as a function of changes in stress along said sensitive axis; and embedding the housing in said block of matter with the stress sensitive axis of the element substantially coincident with said particular direction in which the stress is to be measured, with the pair of output leads extending from said block, whereby the change of stress in said particular axis is determined as a function of a change in the resistivity across said pair of output leads.

2. The method as recited in claim 1 wherein the block of matter is moldable, the method further including the step of etching the exterior surface of the protective rigid housing to increase the bonding properties between the housing and the moldable block of matter.

3. The method as recited in claim 1 wherein the length of said element and the housing is less than one-tenth of an inch and the diameter of the housing less than one-twentieth of an inch, the method further including the step of embedding a separate housing, at substantially a common point, in each of a plurality of directions intersecting said common point, whereby each element senses the stress in a different direction crossing said common point.

4. The method as recited in claim 1 further including steps to minimize the effect of strain of the output leads connected to each element on the element itself, the steps comprising:

prior to embedding the housing in said block of matter, providing a pair of conductive plates;

bonding the pair of conductive plates to opposite ends of the housing;

connecting the ends of the element to be in electrical contact with the pair of plates; and connecting the pair of output leads to be in electrical contact with the pair of plates, whereby strain of the pair of output leads produced in the block of matter due to dimensional changes thereof is absorbed by the plates so as to minimize the strain effect on the sensitive element.

References Cited

UNITED STATES PATENTS 3,009,056  11/1961  Bone et al. _____ 73—141
3,205,464   9/1965  Schwartz _____ 73—141

RICHARD C. QUEISSER, *Primary Examiner.*

JAMES J. GILL, *Examiner.*

C. I. McCLELLAND, *Assistant Examiner.*